United States Patent Office

2,909,518
Patented Oct. 20, 1959

2,909,518

RECOVERY OF VITAMIN $B_{12}$

Hermann Büechl, Hildesheim, Germany, assignor to Heyl & Co. Chemisch-pharmazeutische Fabrik, Hildesheim, Germany No Drawing. Application September 27, 1957
Serial No. 686,586

Claims priority, application Germany October 2, 1956

10 Claims. (Cl. 260—211.5)

The invention relates to the isolation of the vitamin $B_{12}$ factors (cobalamins) from pure or contaminated aqueous solutions containing $B_{12}$ vitamin.

The conventional methods for the recovery of the $B_{12}$ factors utilize adsorption and extraction procedures and particularly chromatographic purification processes.

However, in order to obtain crystalline bioactive end products by said procedure, an extensive pre-purification and concentration is required due to the presence of numerous contaminating substances in the very dilute $B_{12}$ containing solutions. This pre-purification and concentration consume much time and a large amount of solvents, and result in considerable losses of bioactive material. In addition, the separation in chromatographic columns is difficult to carry out on a large scale because of the large throughputs required.

Similar difficulties apply to the recovery procedures by carboxylic ion exchange resins, which have also to be used as columns and are effective only within very narrow pH ranges which have to be constantly maintained.

My invention avoids the difficulties of the recited procedures by separating the vitamin $B_{12}$ factors from the accompanying impurities by forming vitamin $B_{12}$ complex compounds.

It is, therefore, a principal object of my invention to provide a process where complexes of the vitamin $B_{12}$ factors are obtained.

It is another object of my invention to provide new compositions of matter containing complex compounds of vitamin $B_{12}$, which are soluble in organic solvents and are readily decomposed to precipitate the vitamin $B_{12}$ factors.

Another object of my invention is to provide a process whereby said novel compositions are utilized to separate the vitamin $B_{12}$ factors from the impurities associated therewith in vitamin $B_{12}$ containing solutions.

According to the invention, the vitamin $B_{12}$ factors are precipitated from weakly mineral-acidic solution by means of the water-soluble salts of tetraphenyl hydroboric acid $[B(C_6H_5)_4]H$ and triaryl cyanohydroboric acids $[B(Ar)_3CN]H$. The water soluble salts of tetraphenyl hydroboric acid have the formula $$[B(C_6H_5)_4]Me$$

and the salts of the triaryl cyanohydroboric acids the formula $$[B(Ar)_3CN]Me$$

wherein preferably Me is sodium or lithium, and Ar is phenyl or tolyl. It is most convenient to use the salts available in commerce under the trade-names "Kalignost"(=sodium tetraphenyl boron) and "Cäsignost" (=sodium triphenyl cyano boron); for the sake of brevity, said trade-names will frequently be used in the following description. The precipitate, which may contain other coprecipitated monovalent cations, is separated from the solution and dissolved in an organic solvent which is a good solvent for the salts of the vitamin $B_{12}$ factors with said complex hydroboric acids but which does not dissolve or dissolves only sparingly the vitamin $B_{12}$ factors themselves. Suitable solvents are, for instance, acetone and acetonitrile. The solution may be filtered, if necessary; then a concentrated aqueous or methanolic solution of a simple basically reacting alkali metal salt, for instance, alkali metal hydroxide, cyanide, nitrite, rhodanide is added. In this way, the above recited complex salts are decomposed to the originally introduced precipitants which remain in solution, whereas the desired vitamin $B_{12}$ factors precipitate either directly as the characteristic purple crystals, or, in the case of alkali metal cyanide addition, may be readily obtained in crystallized form by processing the violet dicyano complex which partly remains in solution and partly is deposited as amorphous precipitate, in the usual manner.

In this way, all cobalamins, which hardly differ in the reactive atom groups, are recovered in essentially pure form and said purified cobalamins can easily be separated by conventional ways e.g. chromatography by use of apparatus of convenient size.

Diagrammatically, the reaction of cyanocobalamin in weakly acidic solution with sodium tetraphenylboron and sodium cyanide may be represented by the following equations.

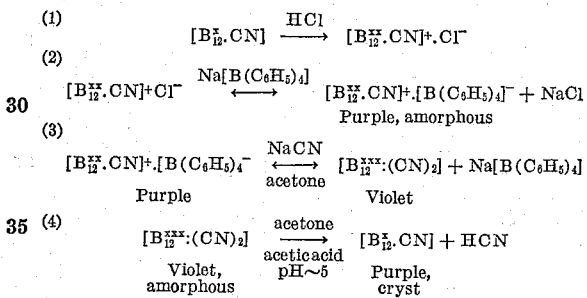

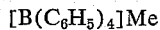=cyanocobalamin; 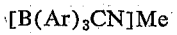+=cyanocobalaminium¹⁺

$[B_{12}^{xxx}:(CN)_2]$=dicyanocobalamin

Not only the ready decomposition of the precipitated cobalaminium tetraphenyl- or triarylcyanoborates by hydrolysis with alkali metal salts with alkaline reaction to the native $B_{12}$ factors (cobalamin) is surprising but also the precipitation reaction itself.

According to our present knowledge of the cobalamin structure, the ionogenous structure normally required for the type of precipitation here involved is blocked intramolecularly in the form of a so-called betaine. This type of compounds is an exception to the onium compounds which generally may be precipitated by the here used strongly specific reagents for monovalent cations. As a matter of fact, the precipitation does not take place either in neutral or acetic acid solution; the precipitation is accomplished only when the cobalamin is converted to a true cobalamin ion. According to the invention, this conversion is obtained either in weak acetic acid solution by the addition of mineral acid salts of three valent metals, such as $AlCl_3$, or by direct weak acidification with mineral acids, such as hydrochloric or sulfuric acid.

With respect to cation[1+] the specific precipitating agent, Cäsignost (sodium triphenyl cyano boron) has the advantage of selectivity because $K^+$ and $NH_4^+$ cations, which may still be present in crudely purified solutions in large amounts, are not co-precipitated; on the other hand, Kalignost (sodium tetraphenyl boron) is superior insofar as the precipitated boron complex salts are more difficultly soluble in water.

It is also possible to precipitate first all monovalent cation impurities from neutral or weak acetic acid solution (pH 4–6 by a sufficient excess of sodium tetraphenyl boron and to separate the precipitate by filtration; then the purified filtrate is made weakly mineral acidic (pH3-6) by addition of mineral acids or trivalent metal salts of such acids, whereby the cobalaminium tetraphenyl borons are precipitated. In solutions containing a large excess of foreign cations$^{1+}$ with respect to cobalamin, the latter may be adsorptively co-precipitated already with said cations. But on treatment with acetone, in which said foreign cation$^{1+}$ precipitates are soluble, the cobalamins are readily recovered.

From the foregoing, it will be seen that my novel vitamin $B_{12}$ precipitation method is susceptible of many modifications, either by variation of the acid medium or of the cation$^{1+}$ specific precipitating agents, or by variation of the solvent and alkali metal salts in the decomposition reaction. In all such modifications, however, the native $B_{12}$ factors (cobalamin) are converted to a true cation (cobalaminium ion), which is precipitated with cation$^{1+}$ specific reagents as a complex salt; said salt is recovered and reconverted by simple means into the native cobalamin.

The only drawback of the precipitating reaction is the required large excess of the relatively expensive reagents; particularly in very dilute $B_{12}$ solutions, said reagents should be present after precipitation still in a concentration of at least .5 percent, in order to obtain substantially quantitative precipitation. However, this drawback is essentially compensated by the possibility to regenerate the reagents from the precipitates. The excess of the reagents in the filtrate may be recovered by precipitation; sodium tetraphenyl boron is precipitated, for instance, with ammonium chloride, and sodium triphenyl and tri-p-tolyl cyano boron with trimethyl ammonium chloride. The obtained ammonium complex salts are then processed in the usual manner to the water soluble alkali metal salts.

Compared with conventional recovery procedures, the novel method has, in addition to the simple procedure, the particular advantage that it can be applied to very dilute crudely pre-purified vitamin $B_{12}$ containing solutions, as they are obtained as aqueous intermediate stages in the processing of liver extracts, microbiological culture broths, and the like.

The following examples are given to illustrate the invention, but it should be understood that they are given by way of illustrations only and not of limitation, and that various changes in details may be made without departing from the spirit of the invention and the scope of the appended claims.

*Example 1*

20 ml. of a pure aqueous solution of 8.9 mg. of crystalline vitamin $B_{12}$ are acidified with 2 drops of glacial acetic acid to a pH of about 4, which pH is adjusted to about 3 by 1 ml. of an .2 n $AlCl_3$ solution; then 6 ml. of an about 3 percent Kalignost solution are slowly added to said solution with stirring. The color of the solution turns from purple to red-orange and a voluminous red precipitate of cobalaminium tetraphenyl boron is obtained, which is allowed to settle. If the supernatant solution is stil reddish colored, some more Kalignost solution is added. Finally, the precipitate is filtered and dried. The amorphous red residue is dissolved in about 10 ml. of acetone. To the purple solution, which may be filtered if necessary, there are added with stirring about .5 ml. of a 1% methanolic KCN or NaCN solution, thereby bringing the solution to pH 8–9. The color turns violet, and after a short time dicyano-cobalamin separates in form of an amorphous violet precipitate, whereby the acetone solution becomes colorless. The precipitate may be sucked off and washed with dry acetone or ether, whereupon the obtained dicyano complex is converted to vitamin $B_{12}$ in the usual manner. In another procedure, the dicyanocobalamin may be directly converted in acetone suspension to vitamin $B_{12}$, by adjusting the pH to about 5 by means of glacial acetic acid and aerating with stirring or shaking. Hereby, the amorphous violet precipitate turns crystalline and purple. After filtration and washing first with acetone and then with dry ether, 8.8 mg. of a crystalline composition are obtained, which behaves in paper chromatographic tests and in microbiological assays like the original crystalline vitamin $B_{12}$.

The excess Kalignost may be recovered from the filtrate of the cobalaminium complex by precipitation with ammonium chloride as ammonium tetraphenyl boron, which is converted to the sodium compound. In this way, about 80 percent of the used Kalignost may be recovered.

*Example 2*

8.8 mg. of vitamin $B_{12}$, 100 mg. of KCl and 100 mg. of $NH_4Cl$ are dissolved in 50 ml. of water and adjusted with dilute $N_2SO_4$ to a pH of 3–4. To the thus obtained red solution, about .5 ml. of an 0.1% Cäsignost solution are added with stirring. The formed voluminous red precipitate of cobalaminium triphenyl cyano boron is separated as described in Example 1.

The excess of Cäsignost is recovered from the filtrate by precipitation with trimethyl ammonium chloride. The obtained precipitate of triphenyl ammonium triphenyl cyano boron is converted to the corresponding sodium salt.

The obtained cobalamin triphenyl cyano boron is dissolved in about 10 ml. of acetone. The purple acetone solution, which may be filtered if necessary, is divided into two portions, which are separately processed as follows:

(*a*) 5 ml. of the acetone solution are treated as set forth in Example 1. Yield: 4 mg. of vitamin $B_{12}$ cryst.

(*b*) 5 ml. of the acetone solution are adjusted by addition of a 10% alcoholic KOH solution to a pH of about 9. A red oil precipitate separates out, and the precipitation is completed by addition of about 2 more ml. of acetone, whereby the solution becomes colorless. The solution is decanted from the precipitated oil, and the oil is repeatedly ground with small amounts of dry acetone whereby it solidifies to crude red crystals. After filtration, the crystals are rinsed with dry ether and airdried. In this way, 3.6 mg. of coarse red crystals are obtained, which in paper chromatograms and microbiological assays present the properties of hydroxycobalamin=vitamin $B_{12b}$.

*Example 3*

From a vitamin $B_{12}$ containing solution as used as starting material in Example 2, the vitamin $B_{12}$ is recovered by making the solution acidic with acetic acid to a pH of about 5. Then the solution is treated with an excess of Kalignost solution, whereby only $K^+$ and $NH^4$ are precipitated as potassium and ammonium tetraphenyl boron, which are filtered and rinsed with small amounts of water until they have become colorless. These salts may be processed to recover the Kalignost.

The combined vitamin $B_{12}$ containing red filtrates are adjusted with 0.2 n $AlCl_3$ solution to a pH of about 3, whereby the excess Kalignost precipitates now the cobalamin as cobalaminium tetraphenyl boron. If necessary, the precipitation may be completed by addition of a few ml. of the Kalignost solution until the red color of the supernatant solution has disappeared. The voluminous red precipitate is then processed as described in Example 1. Yield: 7 mg. of vitamin $B_{12}$ cryst.

*Example 4*

An aqueous crude vitamin $B_{12}$ extract is obtained from a 4 liter fermentation with *Streptomyces olivaceous* by the conventional steps of decomposition, charcoal absorption, elution, salting out, acetone extraction, acetone removal, and solution in water. 50 ml. of said extract, which contains about 50 μg. of vitamin $B_{12}$ per ml., are made slightly acidic (pH about 4) by addition of acetic acid. Subsequently, 0.2 n $AlCl_3$ solution is added until the pH is about 3.

Any precipitated impurities may be removed by filtration or separation; this is, however, not necessary for the further processing.

An excess of an about 3% aqueous Cäsignost solution (sodium triphenyl cyano boron) is added to the brownish clear or cloudy solution until complete precipitation. The precipitate is allowed to settle, and filtered or separated from the liquid. The solid residue is dried in vacuo over drying agents, while the excess Cäsignost is recovered from the filtrate as set forth above.

The brown-red lacquerlike residue is taken up in about 10 ml. of acetone. The red solution is filtered and processed as described in Example 2a or 2b.

Yield: 2.5 mg. of a red-brown crystallizate which dissolves in water with the red color typical of vitamin $B_{12}$ and shows in the growth assay with *Lactobacillus leichmannii* a content of about 70 percent of active vitamin $B_{12}$ and $B_{12b}$, respectively.

If the aqueous solution of said crystallizate is treated according to Example 1, vitamin $B_{12}$ of highest purity is obtained.

In the foregoing examples, the sodium boron complex compounds have been used as precipitating agents because said compounds are available in commerce. However, it should be noted that the corresponding lithium complex compounds may be used in the same manner.

The term vitamin $B_{12}$ factors as used in the specification and claims refers to those substances which like vitamin $B_{12}$ are active in the treatment of pernicious anemias.

I claim:

1. A process for recovering vitamin $B_{12}$ factors from an aqueous solution containing vitamin $B_{12}$ which comprises adjusting said solution to a pH of about 3–4 by addition of a member of the group consisting of mineral acids and a mixture of acetic acid with a trivalent metal salt of a mineral acid, adding to said solution a water soluble alkali metal salt of a boron complex selected from the group consisting of $Me[(C_6H_5)_4B]$, $Me[(C_6H_5)_3CNB]$,
$Me[(p-C_6H_4.CH_3)_3CNB]$ wherein Me is a member of the group consisting of sodium and lithium, in an amount sufficient to precipitate the vitamin $B_{12}$ as a complex compound in which said Me is replaced by cobalaminium, separating said cobalaminium complex compound from the solution, and recovering vitamin $B_{12}$ from said complex compound.

2. The process as defined in claim 1 wherein said trivalent metal salt is an aluminum salt selected from the group of aluminum chloride and aluminum sulfate.

3. The process as defined in claim 1 including the steps of dissolving said cobalaminium complex compound in acetone in which the cobalamins themselves are difficultly soluble, adding to said solution the solution of an alkali metal salt of alkaline reaction selected from the group consisting of sodium hydroxide, sodium cyanide, sodium chodanide, sodium nitrite, and the corresponding potassium salts, thereby decomposing said cobalaminium complex to the corresponding soluble alkali metal complex and to the solid cobalamins, and recovering said solid cobalamins.

4. The process as defined in claim 1 including the steps of dissolving said cobalaminium complex compound in acetone, adding a concentrated solution of an alkali metal cyanide, thereby obtaining by metathetical reaction precipitated dicyano-cobalamins and dissolved alkali metal, and complex, and separating said dicyanocobalamins from said alkali metal complex.

5. Cobalaminium tetraphenyl boron.

6. Cobalaminium triphenyl cyano boron.

7. Cobalaminium tri-p-tolyl cyano boron.

8. Cobalaminium triaryl cyano boron.

9. The process as defined in claim 3 wherein said alkali metal salt is applied in alcoholic solution.

10. The process as defined in claim 3 wherein said alkali metal salt is a member of the group consisting of sodium hydroxide, sodium cyanide, sodium rhodanide, sodium nitrite, and the corresponding potassium salts.

No references cited.